United States Patent
Brown et al.

(10) Patent No.: US 8,922,398 B2
(45) Date of Patent: Dec. 30, 2014

(54) METHOD OF GENERATING AND PROVIDING A PASSWORD TO A HANDHELD ELECTRONIC DEVICE

(75) Inventors: Michael Kenneth Brown, Fergus (CA); Michael Grant Kirkup, Waterloo (CA); Michael Stephen Brown, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 1139 days.

(21) Appl. No.: 12/490,806

(22) Filed: Jun. 24, 2009

(65) Prior Publication Data
US 2010/0328110 A1 Dec. 30, 2010

(51) Int. Cl.
H03K 17/94 (2006.01)
H03M 11/00 (2006.01)
G06F 3/02 (2006.01)
G09G 5/00 (2006.01)
G06F 21/31 (2013.01)

(52) U.S. Cl.
CPC .................................. *G06F 21/31* (2013.01)
USPC ............................. 341/22; 345/168; 345/169

(58) Field of Classification Search
USPC ......... 341/23, 20, 22; 707/9; 704/3; 345/168, 345/169; 340/5.54
See application file for complete search history.

(56) References Cited

U.S. PATENT DOCUMENTS

| | | | |
|---|---|---|---|
| 4,601,011 A | 7/1986 | Grynberg | |
| 4,688,020 A | 8/1987 | Kuehneman et al. | |
| 5,091,393 A | 2/1992 | Den Hartog et al. | |
| 5,442,342 A | 8/1995 | King | |
| 5,786,776 A | 7/1998 | Kisaichi et al. | |
| 5,818,437 A | 10/1998 | Grover et al. | |
| 5,945,928 A | 8/1999 | Kushler et al. | |
| 5,953,541 A | 9/1999 | King et al. | |
| 6,172,625 B1 | 1/2001 | Jin et al. | |
| 6,178,236 B1 | 1/2001 | Jreij et al. | |

(Continued)

FOREIGN PATENT DOCUMENTS

| | | |
|---|---|---|
| CA | 2536993 | 8/2006 |
| EP | 1 693 737 A1 | 2/2005 |

(Continued)

OTHER PUBLICATIONS

Office Communication for Application No. 09163646.4, from the European Patent Office, dated Jun. 21, 2013.

(Continued)

*Primary Examiner* — Mohammad Ghayour
*Assistant Examiner* — Jerold Murphy
(74) *Attorney, Agent, or Firm* — Finnegan, Henderson, Farabow, Garrett & Dunner LLP

(57) ABSTRACT

A method of providing a password to a handheld electronic device having a reduced keyboard and a non-predictive keystroke interpretation system, wherein the reduced keyboard is of a particular keyboard type and the non-predictive keystroke interpretation system is of a particular system type. The method includes receiving a first character string in an electronic device, such as, without limitation, a PC, that is separate from the handheld electronic device, generating one or more second character strings in the electronic device based on the particular keyboard type, the first character string, and, possibly, the particular system type, and transmitting the one or more second character strings from the electronic device to the handheld electronic device as the password.

23 Claims, 4 Drawing Sheets

(56) References Cited

U.S. PATENT DOCUMENTS

| | | | |
|---|---|---|---|
| 6,282,659 B1 * | 8/2001 | Brennan | 726/18 |
| 6,876,312 B2 | 4/2005 | Yu | |
| 6,885,317 B1 | 4/2005 | Gutowitz | |
| 7,215,258 B2 * | 5/2007 | Wormald | 341/23 |
| 2004/0165924 A1 | 8/2004 | Griffin | |
| 2004/0178881 A1 | 9/2004 | Otsubo et al. | |
| 2006/0197685 A1 | 9/2006 | Wormald | |
| 2009/0119252 A1 * | 5/2009 | Plestid | 707/3 |

FOREIGN PATENT DOCUMENTS

| | | |
|---|---|---|
| FR | 2818399 | 12/2000 |
| JP | 2003-150552 | 5/2003 |
| WO | 01/90857 A2 | 11/2001 |

OTHER PUBLICATIONS

Office Communication for Application No. 2,708,040, from the Canadian Intellectual Property Office, dated Nov. 8, 2012.

* cited by examiner

METHOD OF GENERATING AND PROVIDING A PASSWORD TO A HANDHELD ELECTRONIC DEVICE

BACKGROUND

1. Field

The disclosed and claimed concept relates generally to handheld electronic devices that have reduced keypads and that employ password protection and, more particularly, to a method of generating and providing a password to such a handheld electronic device from a separate electronic device like a PC.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Roman alphabet, for instance, as well as appropriate punctuation and other symbols.

One way of providing numerous letters in a small space has been to provide a "reduced keyboard" in which multiple letters, symbols, and/or digits, and the like, are assigned to any given key. For example, a touch-tone telephone includes a reduced keyboard by providing twelve keys, of which ten have digits thereon, and of these ten keys, eight have Roman letters assigned thereto. For instance, one of the keys includes the digit "2" as well as the letters "A", "B", and "C". Since a single actuation of such a key potentially could be intended by the user to refer to any of the letters "A", "B", and "C", and potentially could also be intended to refer to the digit "2", the input (by actuation of the key) generally is an ambiguous input and is in need of some type of disambiguation in order to be useful for text entry purposes. Other known reduced keyboards have included other arrangements of keys, letters, symbols, digits, and the like. One example of a reduced keyboard is the keypad 24 forming a part of the handheld electronic device 4 shown in FIG. 1. Keypad 24 is what is known as a reduced QWERTY keyboard.

In order to enable a user to make use of the multiple letters, digits, and the like on any given key in an ambiguous keyboard, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the characters "ABC2", if the user desires to specify the letter "C", the user will press the key three times. Similarly, on the aforementioned keypad 24, if the user desires to specify the letter "C", the user will press the key that includes the characters "CV7" once, and if the user desires to specify the letter "I", the user will press the key that includes the characters "UI3" two times.

Another exemplary keystroke interpretation system would include key chording, of which various types exist. For instance, a particular character can be entered by pressing two keys in succession or by pressing and holding a first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time.

Another keystroke interpretation system that has been employed is a software-based text disambiguation function. In such a system, a user typically presses keys to which one or more characters have been assigned, generally pressing each key one time for each desired letter, and the disambiguation software attempts to predict the intended input. Numerous such systems have been proposed. One example of such a system is disclosed in commonly owned U.S. patent application Ser. No. 10/931,281, entitled "Handheld Electronic Device With Text Disambiguation," the disclosure of which is incorporated herein by reference.

As will be appreciated, certain of the keystroke interpretation systems described above ("multi-tap," chording, and "press-and-hold / press-and-release") rely on the number of times that a key is pressed, the number of keys that are pressed, and/or how long that a key remains pressed, each of which constitute a non-ambiguous key depression sequence, to determine, with certainty, the intended input. Such systems do not attempt to predict an intended input from an ambiguous input like software-based text disambiguation function systems do. Such keystroke interpretation systems shall be referred to herein as "non-predictive keystroke interpretation systems" in order to distinguish them from software-based text disambiguation function keystroke interpretation systems that use software to attempt to predict intended input from an ambiguous input.

Handheld electronic devices that incorporate such a software-based text disambiguation function typically also provide a non-predictive key-based keystroke interpretation system such as the "multi-tap" system described above for use when it is not practical to use the software-based text disambiguation function. In many cases, the use of a non-predictive keystroke interpretation system such as the "multi-tap" system is the default input mode, and the software-based text disambiguation function must be selectively toggled on by the user when desired. In other cases, the software-based text disambiguation function may be automatically toggled off by the handheld electronic device in appropriate circumstances.

The problem, however, is that users of handheld electronic devices that employ a software-based text disambiguation function become accustomed to typing in that mode, wherein a key that includes the character the user wants need only be pressed a single time (even though the key has multiple characters on it). Such users often forget that, in certain situations, the software-based text disambiguation functionality is not utilized by the handheld electronic device and that in those situations they need to enter information in a different mode, such as a "multi-tap" mode or another mode utilizing a non-predictive keystroke interpretation system. Thus, users may at times press keys in a particular order (while thinking text disambiguation functionality is being employed) and expect that a certain string of characters is being input, when in fact, an entirely different string of characters is being input based on a non-predictive keystroke interpretation system employed by the handheld electronic device because, at that moment, that system, and not the text disambiguation system, is active on the handheld electronic device. For example, a user may think they are inputting the word "THE" by consecutively pressing the keys, only once, that include the letters "T-H-E", since if the text disambiguation system were active, then it is likely that the input string "THE" would result from this sequence of key pressing. However, in actuality, if the text disambiguation system is in fact not active, and instead a non-predictive keystroke interpretation system such as a multi-tap system is active, the input string that will result from consecutively pressing the keys, only once, that include the letters "T-H-E" will be something different than the input string "THE." For example, in the case of the keypad 24 shown in FIG. 1 in a multi-tap mode, the input string "TGE" will result from that key depression sequence. This is the case because, referring to FIG. 1, in multi-tap mode, a single press of the key including the letter "T" will result in a "T" being input, a single press of the key including the letter "H" will result in a "G" being input, and a single press of the key including the letter "E" will result in an "E" being input. For obvious reasons, this confusion may result in problems with inputting information into such a handheld electronic device.

The problem described above is particularly acute when the establishment and input of passwords is required. As is known, most handheld electronic devices include security measures designed to ensure that only an authorized user of the handheld electronic device is able to use the handheld electronic device and access and use the data and applications provided and stored thereon. Typically, such measures are implemented by requiring that a user established password be entered into the handheld electronic device before it may be "unlocked" and used. The handheld electronic device will not move to an unlocked state until it determines that the password entered is valid and therefore accepted. As used herein, the term password refers to a string of any characters that may be input into a handheld electronic device by a user using a keyboard or the like provided as part of the handheld electronic device. In addition, many handheld electronic devices enable a user to synchronize the handheld electronic device with another electronic device, such as a personal computer, in order to synchronize data, such as addresses, calendar appointments, memos, tasks and other personal information management (PIM) data, between the two devices. As is known, this may be accomplished through a wired connection between the two devices or by wireless communications between the two devices. When a handheld electronic device is to be synchronized with another electronic device, a user must typically enter the password associated with the handheld electronic device into the other electronic device using a keyboard provided therewith, which entered password is then transmitted to the handheld electronic device for authentication. This is done to control access to the handheld electronic device to ensure that the handheld electronic device will only synchronize with an authorized electronic device.

A problem may arise, however, when a user of a handheld electronic device having a reduced keyboard as described above establishes a password for the handheld electronic device thinking the handheld electronic device is in a text disambiguation mode utilizing a software-based text disambiguation system, when in fact it is in a different input mode utilizing a non-predictive keystroke interpretation system such as a multi-tap system (most devices use a mode utilizing a non-predictive keystroke interpretation system when setting and inputting passwords). For example, a user may think they are setting their password to the string "THE" by consecutively pressing the keys, only once, that include the letters "T-H-E" during a password setting process (because they mistakenly think the handheld electronic device is in a text disambiguation mode), when in fact, as discussed above, that key pressing sequence will be interpreted as and the password will be set to something else, for example the string "TGE" as described above. The user will be able to subsequently access the handheld electronic device by consecutively pressing the keys on the handheld electronic device that include the letters "T-H-E" when a password is required. In this case, the user again mistakenly thinks they are entering the password "THE" that they set before, when in fact they are again entering "TGE." This does not present a problem for the user because, notwithstanding this mistake, they are still able to access the handheld electronic device. The problem arises, however, when the user tries to synchronize the handheld electronic device with another electronic device, such as a PC, that includes, for example, a standard, non-reduced keyboard. In that situation, the user will be prompted to enter the correct password into the other electronic device, and will press the keys that include the letters "T-H-E," thinking they are properly entering their previously established password. The handheld electronic device, however, will require the string "TGE" in order to permit access, as that was the string actually entered during the password establishment process. The user, having entered the string "THE," will be denied access. A similar problem may arise when trying to pair handheld electronic device 4 with another electronic device, such as a PC, that includes a standard, non-reduced keyboard in order to establish a connection, for example using the Bluetooth™ protocol, between the two. As is known in the art, the term "pairing" means that the two devices have exchanged a password or the like that has been entered into each in order to establish a trusted connection.

Thus, a method is needed for handheld electronic devices having reduced keyboards and a non-predictive keystroke interpretation system that simplifies the inputting of passwords from another separate electronic device seeking access to the handheld electronic device.

BRIEF DESCRIPTION OF THE DRAWINGS

A full understanding of the invention can be gained from the following Description of the Preferred Embodiments when read in conjunction with the accompanying drawings in which.

Similar numerals refer to similar parts throughout the specification.

DESCRIPTION

Figure 1:
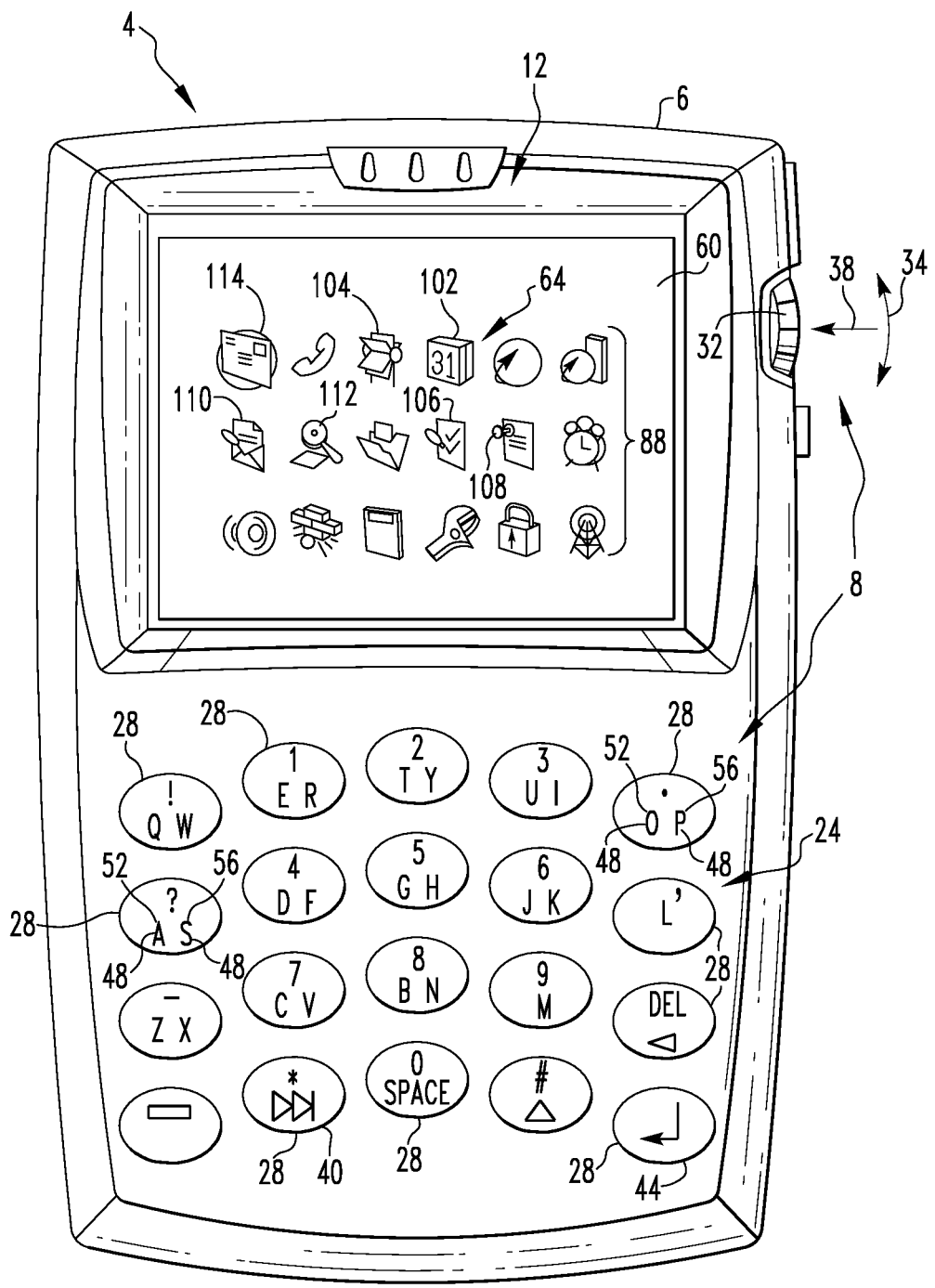
FIG. 1 is a front view of a prior art handheld electronic device.

In one embodiment, the disclosed and claimed concept provides a method of providing a password to a handheld electronic device having a reduced keyboard and a non-predictive keystroke interpretation system, wherein the reduced keyboard is of a particular keyboard type and the non-predictive keystroke interpretation system is of a particular system type. The method includes receiving a first character string in an electronic device, such as, without limitation, a PC, that is separate from the handheld electronic device, generating a second character string in the electronic device based on the particular keyboard type, the particular system type, and the first character string, and transmitting the second character string from the electronic device to the handheld electronic device as the password. The particular system type may be, for example and without limitation, a multi-tap system or a press-and-hold/press-and-release system. In one particular embodiment, the method further includes transmitting the first character string from the electronic device to the handheld electronic device prior to the generating step, and performing the generating and the transmitting the second character string steps only if it is determined that the first character string has not been accepted by the handheld electronic device. In another particular embodiment, the method further includes providing a message on the electronic device indicating that the handheld electronic device has the non-predictive keystroke interpretation system of the particular system type. The message preferably describes how the non-predictive keystroke interpretation system of the particular system type operates.

In another embodiment, the disclosed and claimed concept provides a method of providing a password to a handheld electronic device having a reduced keyboard, wherein the reduced keyboard is of a particular keyboard type. The method includes receiving a first character string in an electronic device, such as, without limitation, a PC, that is separate from the handheld electronic device, generating a plurality of alternative character strings in the electronic device based on the particular keyboard type and the first character string, and transmitting one or more of the alternative character strings from the electronic device to the handheld electronic device as the password.

Preferably, the method further includes transmitting the first character string from the electronic device to the handheld electronic device prior to the generating step, and performing the generating and the transmitting the one or more of the alternative character string steps only if it is determined that the first character string has not been accepted by the handheld electronic device. Also, the transmitting the one or more of the alternative character string steps preferably includes sequentially transmitting two or more of the alternative character strings from the electronic device to the handheld electronic device as the password.

According to a further embodiment, a computer-readable medium, such as the memory 128 described elsewhere herein (FIG. 3) or another storage device like a CD, is provided that stores one or more computer-executable routines for use on an electronic device that is separate from a handheld electronic device having a reduced keyboard of a particular keyboard type. The one or more computer executable routines are adapted to provide a password to the handheld electronic device by receiving a first character string in the electronic device, generating one or more second character strings in the electronic device based on at least the particular keyboard type and the first character string, and transmitting one or more of the one or more second character strings from the electronic device to the handheld electronic device as the password.

Figure 2:
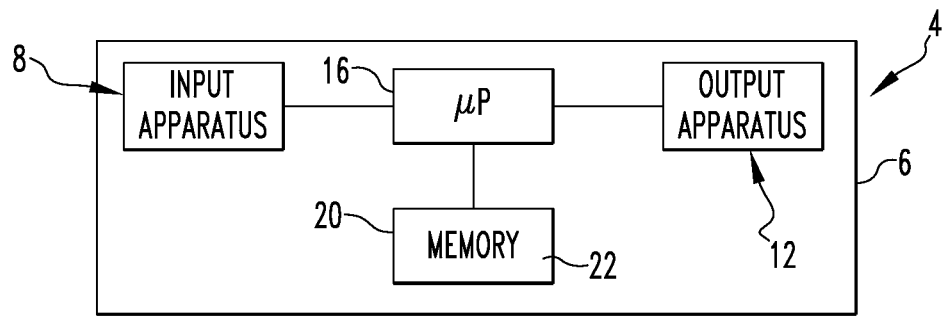
FIG. 2 is a block diagram of the prior art handheld electronic device of FIG. 1.

An exemplary prior art handheld electronic device 4 is indicated generally in FIG. 1 and is depicted schematically in FIG. 2. The exemplary handheld electronic device 4 includes a housing 6 upon which is disposed a processor unit that includes an input apparatus 8, an output apparatus 12, a processor 16, and a memory 20. The processor 16 may be, for instance, and without limitation, a microprocessor (μP) and is responsive to inputs from the input apparatus 8 and provides output signals to the output apparatus 12. The processor 16 also interfaces with the memory 20. Examples of handheld electronic devices are included in U.S. Pat. Nos. 6,452,588 and 6,489,950, the disclosures of which are incorporated by reference herein.

As can be understood from FIG. 1, the input apparatus 8 includes a keypad 24 and a thumbwheel 32. As will be described in greater detail below, the keypad 24 is in the exemplary form of a reduced QWERTY keyboard including a plurality of keys 28 that serve as input members. It is noted, however, that the keypad 24 may be of other reduced configurations, such as a reduced AZERTY keyboard, a reduced QWERTZ keyboard, or other keyboard arrangement, whether presently known or unknown. In this regard, the expression "reduced" and variations thereof, in the context of a keyboard, such as a keypad or other arrangement of input members, shall refer broadly to an arrangement in which at least one of the input members has assigned thereto a plurality of characters within a given set, such as a plurality of letters, for example, in the set of Roman letters, for example, thereby rendering ambiguous an intended result of an actuation of the at least one of the input members.

In this regard, and as will be set forth below in greater detail, the system architecture of the handheld electronic device 4 advantageously is organized to be operable independent of the specific layout of the keypad 24. Accordingly, the system architecture of the handheld electronic device 4 can be employed in conjunction with virtually any keypad layout substantially without requiring any meaningful change in the system architecture. It is further noted that certain of the features set forth herein are usable on either or both of a reduced keyboard and a non-reduced keyboard.

The keys 28 are disposed on a front face of the housing 6, and the thumbwheel 32 is disposed at a side of the housing 6. The thumbwheel 32 can serve as another input member and is both rotatable, as is indicated by the arrow 34, to provide selection inputs to the processor 16, and also can be pressed in a direction generally toward the housing 6, as is indicated by the arrow 38, to provide another selection input to the processor 16. Alternatively, a trackball may be provided on the front face of the housing 6. Preferably, such a trackball would be rotatable to provide navigational and other input to the processor 16, and translatable in a direction inwardly toward the handheld electronic device 4 to provide other inputs, such as selection inputs.

Among the keys 28 of the keypad 24 are a <NEXT> key 40 and an <ENTER> key 44. The <NEXT> key 40 can be pressed to provide a selection input to the processor 16 and provides substantially the same selection input as is provided by a rotational input of the thumbwheel 32. Since the <NEXT> key 40 is provided adjacent a number of the other keys 28 of the keypad 24, the user can provide a selection input to the processor 16 substantially without moving the user's hands away from the keypad 24 during a text entry operation.

As can further be seen in FIG. 1, many of the keys 28 include a number of characters 48 disposed thereon. As employed herein, the expression "a number of" and variations thereof shall refer broadly to any quantity, including a quantity of one, and in certain circumstances herein can also refer to a quantity of zero. In the exemplary depiction of the keypad 24, many of the keys 28 include two or more characters, such as including a first character 52 and a second character 56 assigned thereto. It is understood that the expression "characters" shall broadly be construed to include letters, digits, symbols and the like and can additionally include ideographic characters, components thereof, other linguistic elements, and the like. The keys 28 having one or more characters 48 or other linguistic elements can be considered to be linguistic input members.

One of the keys 28 of the keypad 24 includes as the characters 48 thereof the letters "Q" and "W", and an adjacent key 28 includes as the characters 48 thereof the letters "E" and "R". It can be seen that the arrangement of the characters 48 on the keys 28 of the keypad 24 is generally of a QWERTY arrangement, albeit with many of the keys 28 including two of the characters 48.

Referring again to FIG. 1, the output apparatus 12 includes a display 60 upon which is provided an example output 64. The display 60 may also include a caret (e.g., cursor) (not shown) that depicts generally where the next input from the input apparatus 8 will be received. The output 64 of FIG. 1 is depicted as displaying a home screen that represents a number of applications depicted as corresponding discrete icons 88. The applications include, for example, a Calendar application, an Address Book application, a Tasks application, a MemoPad (Memos) application, a Messages application, a Global Search application, and an E-mail application. The corresponding icons 88 include, for example, the Calendar icon 102, the Address Book icon 104, the Tasks icon 106, the MemoPad icon 108, the Messages icon 110, the Global Search icon 112, and the E-mail icon 114, respectively.

In FIG. 1, the home screen output 64 is currently active and would constitute another one of the applications. One of the other applications, such as the Messages application, can be initiated from the home screen output 64 by providing a suitable input through the input apparatus 8, such as by suitably rotating the thumbwheel 32 and providing a selection input by translating the thumbwheel 32 in the direction indicated by the arrow 38. For example, the home screen output 64 displays the icon 112 associated with the Global Search application 100, and accepts input from the input apparatus 8 to launch a global search from that icon.

Although not expressly shown in FIG. 1, the icons 88 may be part of a ribbon (not shown) including a series of icons that form a device toolbar (not shown) or taskbar (not shown) on the home screen output 64.

The memory 20 is depicted schematically in FIG. 2. The memory 20 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 20 additionally includes a number of routines depicted generally with the numeral 22 for the processing of data. The routines 22 can be in any of a variety of forms such as, without limitation, software, firmware, and the like. The routines 22 include a software-based text disambiguation function as described elsewhere herein as an application, as well as other routines. In addition, the routines 22 also include a non-predictive keystroke interpretation system, preferably a "multi-tap" system, that allows a user to substantially unambiguously specify a particular character 48 on a particular key 28 by pressing the same key 28 a number of times equivalent to the position of the desired character 48 on the key 28.

Figure 3:
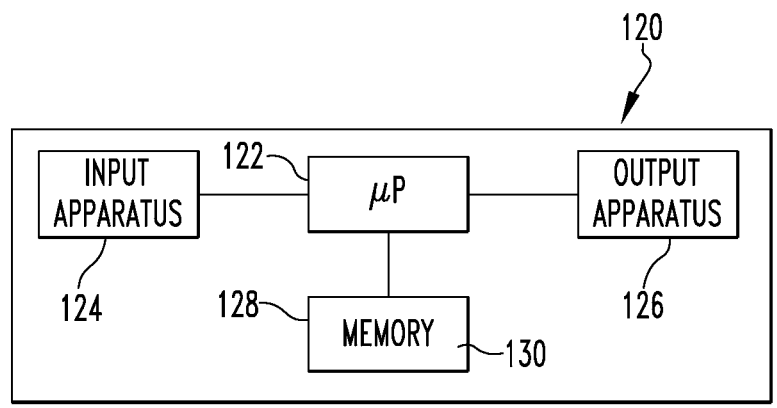
FIG. 3 is a block diagram of an embodiment of a separate electronic device in which the disclosed and claimed concept may be implemented.

According to an aspect of the disclosed concept, handheld electronic device 4 includes a routine 22, stored in memory 20 and executable by processor 16, for setting passwords required for "unlocking" handheld electronic device 4 when handheld electronic device 4 is in a "locked," password protected state and for verifying that a separate electronic device 120, such as, without limitation, a PC, shown in FIG. 3 is authorized to be linked with handheld electronic device 4 over an electronic connection (which may be wired or wireless) by providing the correct password to handheld electronic device 4. As seen in FIG. 3, which is a block diagram of an exemplary separate electronic device 120, the separate electronic device 120 includes a processor 122, an input apparatus 124, an output apparatus 126 and a memory 128. The processor 122 may be, for instance, and without limitation, a microprocessor (μP), and is responsive to inputs from the input apparatus 124 and provides output signals to the output apparatus 126. The processor 122 also interfaces with the memory 128. The memory 128 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 128 additionally includes a number of routines depicted generally with the numeral 130 for the processing of data. The routines 130 can be in any of a variety of forms such as, without limitation, software, firmware, and the like. The input apparatus 124 preferably includes a keyboard, which may be a non-reduced keyboard or a reduced keyboard. In the case where the input apparatus 124 includes a reduced keyboard, the routines 130 preferably include a software-based text disambiguation function as described elsewhere herein as an application, and/or a non-predictive keystroke interpretation system, preferably a "multi-tap" system, as described elsewhere herein as an application.

Figure 4:
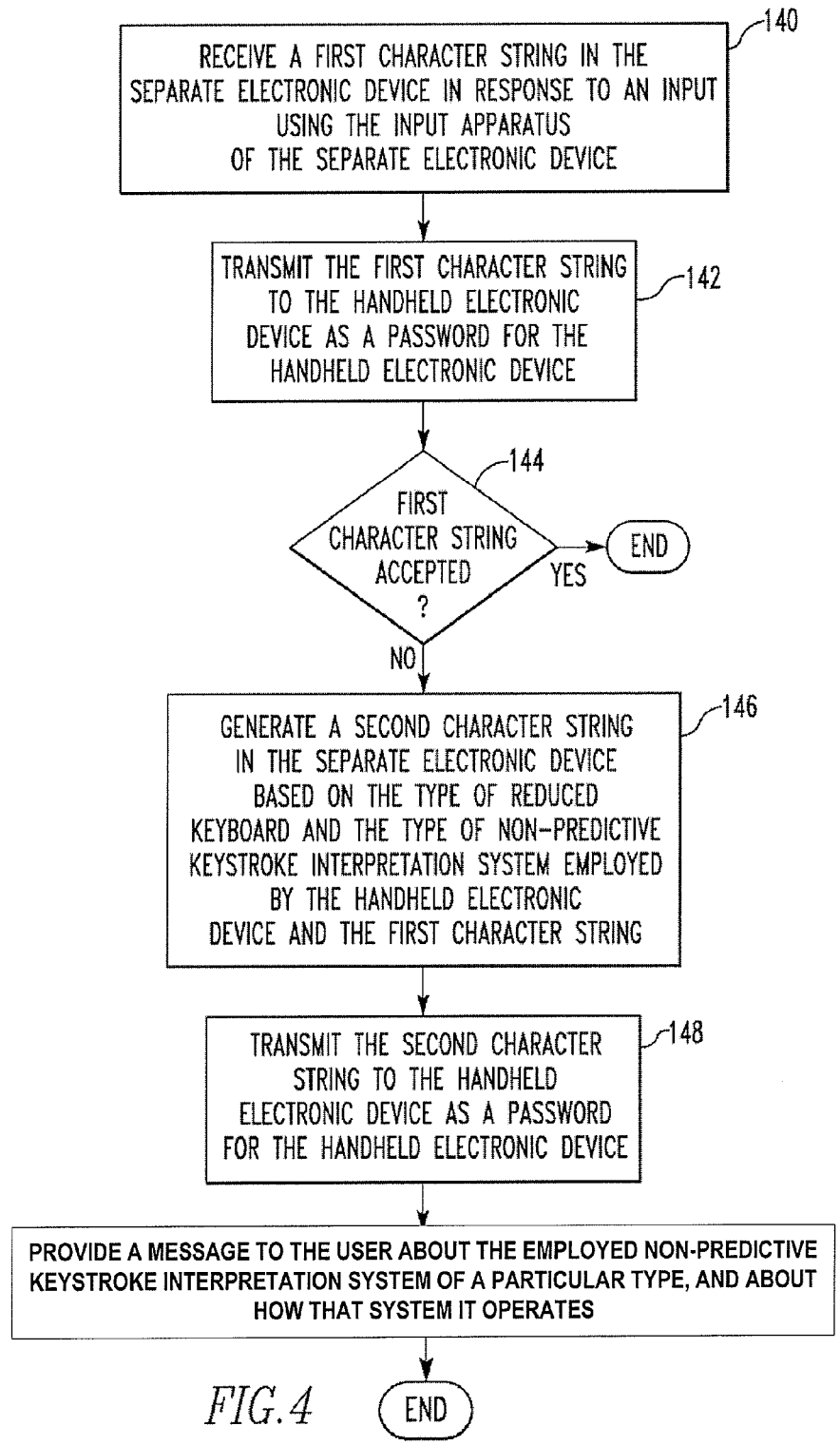
FIG. 4 is a flowchart depicting one embodiment of a routine executed by the processor of the separate electronic device of FIG. 3 for generating and providing a password to the handheld electronic device of FIGS. 1 and 2.

FIG. 4 is a flowchart of a method (preferably implemented as one of the routines 130 in the separate electronic device 120) according to one embodiment of the disclosed and claimed concept for generating in the electronic device 120 a character string for use as a password in order to gain authorized access to the handheld electronic device 4 from the electronic device 120. The method of FIG. 4 assumes that a password (consisting of a particular character string) for the handheld electronic device 4 has been previously established in a situation, as described elsewhere herein, where the user of the handheld electronic device 4 establishes the password thinking that the handheld electronic device 4 is in a text disambiguation mode utilizing a software-based text disambiguation system, when in fact it is in a different input mode utilizing a non-predictive keystroke interpretation system such as a multi-tap system. For example, the user may think that he or she set their password to the string "THE" by consecutively pressing the keys, only once, that include the letters "T-H-E" during a password setting process (because he or she mistakenly thinks the handheld electronic device is in a text disambiguation mode), when in fact that key pressing sequence was interpreted as and the password was set to the string "TGE" by the multi-tap system. As another example, the user may think that he or she set their password to the string "ARMY" by consecutively pressing the keys, only once, that include the letters "A-R-M-Y" during a password setting process (because he or she mistakenly thinks the handheld electronic device is in a text disambiguation mode), when in fact that key pressing sequence was interpreted as and the password was set to the string "AEMT" by the multi-tap system. In addition, the method of FIG. 4 assumes that the electronic device 120 knows both the type of reduced keyboard that is employed by the handheld electronic device 4

(e.g., reduced QWERTY, reduced AZERTY, etc.; by type it is meant the configuration of the keys including the characters assigned to each key) and the type of non-predictive keystroke interpretation system that is employed by the handheld electronic device 4 (e.g., multi-tap, press-and-hold/press-and-release, etc.). This information may be pre-stored in the memory 128 of the electronic device 120, or, alternatively, may be communicated to the electronic device 120 by the handheld electronic device 4 at the beginning of an access authorization process.

The method begins at step 140, wherein a first character string is received in the separate electronic device 120 in response to a user input using the input apparatus 124 of the separate electronic device 120. If the input apparatus 124 includes a non-reduced keyboard, the first character string will correspond to the un-ambiguous input that results from the user pressing the keys of the non-reduced keyboard. Alternatively, if the input apparatus 124 includes a reduced keyboard, then the depression of the keys by the user will be ambiguous, and the first character string will result from the key depression sequence either (i) being disambiguated by the software-based text disambiguation function that is provided with the separate electronic device 120, or (ii) being interpreted by the non-predictive keystroke interpretation system that is provided with the separate electronic device 120, whichever the case may be. In addition, in step 140, the user will input as the intended first character string the password that they believe they have previously set on the handheld electronic device 4. Thus, in the examples provided above, the user will intend to input the password "THE" or "ARMY" in each example.

Next, at step 142, the separate electronic device 120 will transmit (either wirelessly or through a wired connection) the received first character string to the handheld electronic device 4 as a password for gaining access to the handheld electronic device 4. Then, at step 144, a determination is made in the separate electronic device 120 as to whether the first character string has been accepted by the handheld electronic device 4 (this will typically be based on a message received by the separate electronic device 120 from the handheld electronic device 4). If the answer at step 144 is yes, then the method ends. This may result if the user is actually able to set the password on the handheld electronic device 4 to a character string that is the character string they believe they were inputting. In other words, if the user has not made the mistake regarding the type of input mode during the password setting process that is described elsewhere herein. In such a case, what the user believes is his or her password will actually be his or her password as established on the handheld electronic device 4.

If, however, the answer at step 144 is no, which will be the case if the password that is actually set in the handheld electronic device 4 is not what the user believes it to be, then the method proceeds to step 146. At step 146, a second character string is generated in the separate electronic device 120 based on: (i) the type of reduced keyboard employed by the handheld electronic device 4, (ii) the type of non-predictive keystroke interpretation system employed by the handheld electronic device 4, and (iii) the first character string that was received in step 140. For example, if the separate electronic device 120 knows that the type of reduced keyboard is a reduced QWERTY keyboard and that the type of non-predictive keystroke interpretation system employed by the handheld electronic device 4 is a multi-tap system, then based on the first character string, the separate electronic device 120 will be able to determine the actual password that was set by the user for the handheld electronic device 4. For example, if the user mistakenly believes that his or her password is "THE" (when in fact it was set to "TGE" as described elsewhere herein), then, in step 146, the separate electronic device 120 will be able to determine that the actual password is "TGE." Similarly, if the user mistakenly believes that the actual password that is set in the handheld electronic device 4 is "ARMY" (when in fact it was set to "AEMT" as described elsewhere herein), then the separate electronic device 120 will be able to determine that the actual password set in the handheld electronic device 4 is "AEMT." As another example, if the type of reduced keyboard that is employed by the handheld electronic device 4 is a reduced QWERTY keyboard and if the type of non-predictive keystroke interpretation system that is employed by the handheld electronic device 4 is a press-and-hold/press-and-release system, wherein a first character on a key is entered by a press-and-hold actuation and the second character on a key is entered by a press-and-release actuation, then based on that information, the separate electronic device 120 will be able to determine what the actual password of the handheld electronic device 4 is based on the first character string received in step 140. For example, if the character string "THE" is received in step 140, then at step 146, the second character string that is generated will be "YHR." Similarly, if the first character string that is received in step 140 is "ARMY," then the second character string that will be generated in step 146 will be "SRMY." Following step 146, the method proceeds to step 148, wherein the second character string is transmitted to the handheld electronic device 4 as a password for the handheld electronic device 4. As noted above, that second character string should be the correct password and should enable the handheld electronic device 4 to be accessed from the separate electronic device 120.

Optionally, following step 148, the separate electronic device 120 may be adapted to test whether the second character string was in fact accepted by the handheld electronic device 4. If, for some reason, it was not accepted, then the separate electronic device 120 may be adapted to provide a message to the user indicating that a problem with password access exists. This may occur if the user committed some other type of error when trying to set his or her password on the handheld electronic device 4 or has not remembered correctly what he or she thought they were setting as their password during the password setting process. As a further optional alternative, the separate electronic device 120 may, following successful transmission and use of the second character string to gain access to the handheld electronic device 4, provide a message to the user (e.g., as a dialogue box displayed on the output apparatus 126) which informs the user that the handheld electronic device 4 includes a particular type of non-predictive keystroke interpretation system and that that system was used when setting the password for the handheld electronic device 4 so that the user may consider resetting their password with this condition in mind. That message may also provide some instruction as to how the non-predictive keystroke interpretation system functions (for example, it may describe how a multi-tap system operates and/or how a press-and-hold/press-and-release system operates). Thus, if the user resets his or her password knowing that the non-predictive keystroke interpretation system is used in that process, the user will thereafter actually have a match between the password that is actually set in the handheld electronic device 4 and the password that the user believes he or she has set.

Figure 5:
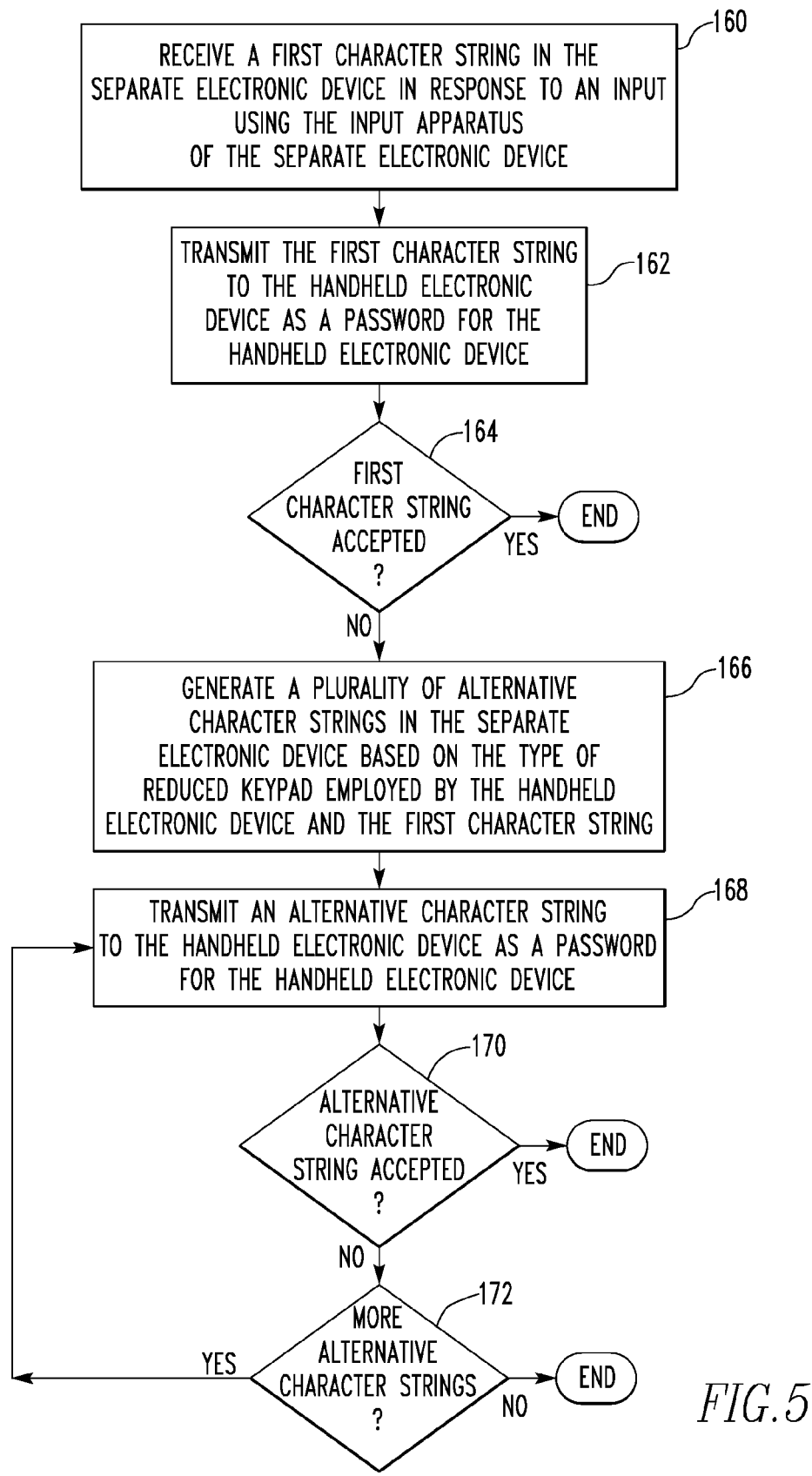
FIG. 5 is a flowchart depicting one embodiment of a routine executed by the processor of the separate electronic device of FIG. 3 for generating and providing a password to the handheld electronic device of FIGS. 1 and 2.

FIG. 5 is a flowchart of a method (preferably implemented as one of the routines 130 in the separate electronic device 120) according to an alternative embodiment for generating in the electronic device 120 a plurality of character strings for use as a password in order to gain authorized access to the handheld electronic device 4 from the electronic device 120. The method of FIG. 5 assumes that a password (consisting of a particular character string) for the handheld electronic device 4 has been previously established in a situation, as described elsewhere herein, where the user of the handheld electronic device 4 establishes the password thinking that the handheld electronic device 4 is in a text disambiguation mode utilizing a software-based text disambiguation system, when in fact it is in a different input mode utilizing a non-predictive keystroke interpretation system such as a multi-tap system. The method of FIG. 5 differs from the method of FIG. 4 in that it assumes that the electronic device 120 knows the type of reduced keyboard that is employed by the handheld electronic device 4 (e.g., reduced QWERTY, reduced AZERTY, etc.; by type it is meant the configuration of the keys including the characters assigned to each key), but does not know the type of non-predictive keystroke interpretation system that is employed by the handheld electronic device 4 (e.g., multi-tap, press-and-hold/press-and-release, etc.). The type of reduced keyboard that is employed by the handheld electronic device 4 may be pre-stored in the memory 128 of the electronic device 120, or, alternatively, may be communicated to the electronic device 120 by the handheld electronic device 4 at the beginning of an access authorization process. Because the electronic device 120 only knows the type of reduced keyboard that is employed by the handheld electronic device 4, and not the type of non-predictive keystroke interpretation system that is employed by the handheld electronic device 4, it cannot determine from a received character string a single character string that should, with relative certainty, be the actual password for the handheld electronic device 4 in the event the user made the mistake described elsewhere herein when setting the password. Instead, as described in detail below, the separate electronic device 120 will, from the received character string and with knowledge of the type of reduced keyboard employed by the handheld electronic device 4, be able to generate a plurality of alternative character strings that may possibly be the actual password for the handheld electronic device 4.

The method begins at step 160, wherein a first character string is received in the separate electronic device 120 in response to a user input using the input apparatus 124 of the separate electronic device 120. If the input apparatus 124 includes a non-reduced keyboard, the first character string will correspond to the un-ambiguous input that results from the user pressing the keys of the non-reduced keyboard. Alternatively, if the input apparatus 124 includes a reduced keyboard, then the depression of the keys by the user will be ambiguous, and the first character string will result from the key depression sequence either (i) being disambiguated by the software-based text disambiguation function that is provided with the separate electronic device 120, or (ii) being interpreted by the non-predictive keystroke interpretation system that is provided with the separate electronic device 120, whichever the case may be. In addition, in step 140, the user will input as the intended first character string the password that they believe they have previously set on the handheld electronic device 4. Thus, in the examples provided above, the user will intend to input the password "THE" or "ARMY" in each example.

Next, at step 162, the separate electronic device 120 will transmit (either wirelessly or through a wired connection) the received first character string to the handheld electronic device 4 as a password for gaining access to the handheld electronic device 4. Then, at step 164, a determination is made in the separate electronic device 120 as to whether the first character string has been accepted by the handheld electronic device 4 (this will typically be based on a message received by the separate electronic device 120 from the handheld electronic device 4). If the answer at step 164 is yes, then the method ends. This may result if the user is actually able to set the password on the handheld electronic device 4 to a character string that is the character string they believe they were inputting. In other words, if the user has not made the mistake regarding the type of input mode during the password setting process that is described elsewhere herein. In such a case, what the user believes is his or her password will actually be his or her password as established on the handheld electronic device 4.

If, however, the answer at step 164 is no, which will be the case if the password that is actually set in the handheld electronic device 4 is not what the user believes it to be, then the method proceeds to step 166. At step 166, the separate electronic device 120 generates a plurality of alternative character strings based on the type of reduced keyboard employed by the handheld electronic device 4 and the first character string received in step 160. More specifically, the separate electronic device 120 will generate a plurality of alternative character strings based upon various combinations of characters that are present on the keys of the reduced keyboard of the handheld electronic device 4 that include the characters of the first character string. For example, if the first character string is "THE," then the alternative character strings may include "THR," "TGE," "TGR," "YGE," "YGR," "YAG," and "YHR." In a particular embodiment, the plurality of alternative character strings may be generated in a preferred order wherein the character strings that would correspond to particular types of non-predictive keystroke interpretation systems being employed on the handheld electronic device 4 are generated first and given a priority. For example, the separate electronic device 120 may generate the alternative character string that would correspond to a multi-tap system, namely "TGE," and the alternative character string that would correspond to a press-and-hold/press-and-release system, namely "THR," and use those alternative character strings first when transmitting the alternative character strings to the handheld electronic device 4 as described below.

Following step 166, the method proceeds to step 168, wherein the separate electronic device 120 transmits a first one of the alternative character strings to the handheld electronic device 4 as a password for the handheld electronic device 4. As noted above, this first character string may be one of the character strings that is given a priority. Next, at step 170, a determination is made as to whether the first alternative character string was accepted by the handheld electronic device 4. If the answer is yes, then the method ends. If, however, the answer is no, then, at step 172, a determination is made as to whether there are more alternative character strings left to be tried as the password. If the answer is no, then the method ends and, optionally, a message may be provided to the user through the output apparatus 126 indicating that a successful password could not be determined. If, however, the answer at step 172 is yes, meaning that there are still alternative character strings left to be tried, then the method returns to step 168, wherein the next available alternative character string is transmitted to the handheld electronic device 4 as a password for the handheld electronic device 4. Again, as noted above, the next alternative character string that is used may be chosen based upon a priority value or level assigned to it. In other words, in this particular embodiment, in steps 168-172, the alternative character strings that correspond to specific types of non-predictive keystroke interpretation systems are tried first.

Thus, in the method of FIG. 5, the alternative character strings that were generated in step 166 will be sequentially transmitted to the handheld electronic device 4 by the separate electronic device 120 in an effort to find an alternative character string that will match the stored password for the handheld electronic device 4.

As demonstrated above, the method embodiments shown in FIGS. 4 and 5, and described in connection therewith, provide solutions to the problem presented when a user of a handheld electronic device, such as the handheld electronic device 4, that has a reduced keyboard mistakenly establishes a password for that handheld electronic device 4 thinking that the text-disambiguation function is being employed. The methods of FIGS. 4 and 5 thus allow the user to enter the password that they believe (although mistakenly) they have previously set into a separate electronic device, such as the electronic device 120, and still gain access to the handheld electronic device 4.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of providing a password to a handheld electronic device having a reduced keyboard, said reduced keyboard being of a particular keyboard type, said handheld electronic device having a non-predictive keystroke interpretation system, said non-predictive keystroke interpretation system being of a particular system type, the method comprising:

receiving a first password in an electronic device separate from said handheld electronic device, wherein said first password contains a string of alphabetic characters;

generating, during a process of gaining authorized access to said handheld electronic device, a second password in said electronic device based on said particular keyboard type, said particular system type, and said first password, said particular keyboard type being received by said electronic device from said handheld electronic device, wherein said second password contains a string of alphabetic characters; and transmitting said second password from said electronic device to said handheld electronic device.

2. The method according to claim 1, wherein said particular system type is a multi-tap system.

3. The method according to claim 1, wherein said particular system type is a press-and-hold/press-and-release system.

4. The method according to claim 1, further comprising transmitting said first password from said electronic device to said handheld electronic device prior to said generating step, and performing said generating and said transmitting said second password steps only if it is determined that said first password has not been accepted by said handheld electronic device.

5. The method according to claim 1, further comprising providing a message on said electronic device indicating that said handheld electronic device has said non-predictive keystroke interpretation system of said particular system type.

6. The method according to claim 5, said message describing how said non-predictive keystroke interpretation system of said particular system type operates.

7. A method of providing a password to a handheld electronic device having a reduced keyboard, said reduced keyboard being of a particular keyboard type, the method comprising:

receiving a first password in an electronic device separate from said handheld electronic device, wherein said first password contains a string of alphabetic characters;

generating, during a process of gaining authorized access to said handheld electronic device, a plurality of alternative passwords in said electronic device based on said particular keyboard type and said first password, said particular keyboard type being received by said electronic device from said handheld electronic device, wherein said second password contains a string of alphabetic characters; and transmitting one or more of said alternative passwords from said electronic device to said handheld electronic device as said password.

8. The method according to claim 7, further comprising transmitting said first password from said electronic device to said handheld electronic device prior to said generating step, and performing said generating and said transmitting said one or more of said alternative password steps only if it is determined that said first password has not been accepted by said handheld electronic device.

9. The method according to claim 7, wherein said transmitting said one or more of said alternative password step comprises sequentially transmitting two or more of said alternative passwords from said electronic device to said handheld electronic device.

10. The method according to claim 9, wherein said generating comprises generating one of said plurality of alternative passwords in said electronic device based on said particular keyboard type, said first passwords and a non-predictive keystroke interpretation system type, wherein said one of said plurality of alternative passwords is the first one of said two or more of said alternative passwords that is transmitted from said electronic device to said handheld electronic device.

11. The method according to claim 9, wherein said generating comprises generating a first one of said plurality of alternative passwords in said electronic device based on said particular keyboard type, said first password and a first non-predictive keystroke interpretation system type and generating a second one of said plurality of alternative passwords in said electronic device based on said particular keyboard type, said first password and a second non-predictive keystroke interpretation system type, wherein said first one of said plurality of alternative passwords and said second one of said plurality of alternative passwords are the first two of said two or more of said alternative passwords that are transmitted from said electronic device to said handheld electronic device.

12. A non-transitory computer readable medium storing one or more computer executable routines for use on an electronic device that is separate from a handheld electronic device having a reduced keyboard of a particular keyboard type, said one or more computer executable routines being adapted to provide a password to said handheld electronic device by:

receiving a first password in said electronic device, wherein said first password contains a string of alphabetic characters;

generating, during a process of gaining authorized access to said handheld electronic device, one or more second passwords in said electronic device based on at least said particular keyboard type and said first password, said particular keyboard type being received by said electronic device from said handheld electronic device, wherein said second password contains a string of alphabetic characters; and transmitting one or more of said one or more second character strings passwords from said electronic device to said handheld electronic device as said password.

13. The computer readable medium according to claim 12, wherein said handheld electronic device has a non-predictive keystroke interpretation system, said non-predictive keystroke interpretation system being of a particular system type, wherein said one or more second passwords comprise a single second password, wherein said generating comprises generating said single second password in said electronic device based on said particular keyboard type, said particular system type, and said first password, and wherein said transmitting comprises transmitting said single second password from said electronic device to said handheld electronic device.

14. The computer readable medium according to claim 13, wherein said particular system type is a multi-tap system.

15. The computer readable medium according to claim 13, wherein said particular system type is a press-and-hold/press-and-release system.

16. The computer readable medium according to claim 13, wherein said one or more routines are further adapted to transmit said first password from said electronic device to said handheld electronic device prior to said generating, and perform said generating and said transmitting said single second password only if it is determined that said first password has not been accepted by said handheld electronic device.

17. The computer readable medium according to claim 13, wherein said one or more routines are further adapted to provide a message on said electronic device indicating that said handheld electronic device has said non-predictive keystroke interpretation system of said particular system type.

18. The computer readable medium according to claim 17, said message describing how said non-predictive keystroke interpretation system of said particular system type operates.

19. The computer readable medium according to claim 12, wherein said one or more second passwords comprise a plurality of alternative passwords generated based on said particular keyboard type and said first password, and wherein said transmitting comprises transmitting one or more of said alternative passwords from said electronic device to said handheld electronic device.

20. The computer readable medium according to claim 19, wherein said one or more routines are further adapted to transmit said first password from said electronic device to said handheld electronic device prior to said generating step, and perform said generating and said transmitting said one or more of said alternative passwords only if it is determined that said first password has not been accepted by said handheld electronic device.

21. The computer readable medium according to claim 19, wherein said transmitting said one or more of said alternative password steps comprises sequentially transmitting two or more of said alternative passwords from said electronic device to said handheld electronic device.

22. The computer readable medium according to claim 21, wherein said generating comprises generating one of said plurality of alternative passwords in said electronic device based on said particular keyboard type, said first password and a non-predictive keystroke interpretation system type, wherein said one of said plurality of alternative passwords is the first one of said two or more of said alternative passwords that is transmitted from said electronic device to said handheld electronic device.

23. The computer readable medium according to claim 21, wherein said generating comprises generating a first one of said plurality of alternative passwords in said electronic device based on said particular keyboard type, said first password and a first non-predictive keystroke interpretation system type and generating a second one of said plurality of alternative passwords in said electronic device based on said particular keyboard type, said first password and a second non-predictive keystroke interpretation system type, wherein said first one of said plurality of alternative passwords and said second one of said plurality of alternative passwords are the first two of said two or more of said alternative passwords that are transmitted from said electronic device to said handheld electronic device.

* * * * *

UNITED STATES PATENT AND TRADEMARK OFFICE
CERTIFICATE OF CORRECTION

PATENT NO. : 8,922,398 B2
APPLICATION NO. : 12/490806
DATED : December 30, 2014
INVENTOR(S) : Michael Kenneth Brown, Michael Grant Kirkup and Michael Stephen Brown Page 1 of 1

It is certified that error appears in the above-identified patent and that said Letters Patent is hereby corrected as shown below:

In the Claims

Column 14, Line 21, In Claim 7, delete "device as said password." and insert -- device. --, therefor.

Column 15, Lines 7-8, In Claim 12, delete "second character strings" and insert -- second --, therefor.

Column 15, Line 9, In Claim 12, delete "device as said password." and insert -- device. --, therefor.

Signed and Sealed this
Second Day of June, 2015

Michelle K. Lee
*Director of the United States Patent and Trademark Office*